United States Patent [19]

Medlicott

[11] Patent Number: 5,151,927
[45] Date of Patent: Sep. 29, 1992

[54] DUAL-MODE SYNCHRONIZATION DEVICE, IN PARTICULAR FOR FRAME CLOCK PHASE RECOVERY IN A HALF-DUPLEX TRANSMISSION SYSTEM

[75] Inventor: Mark Medlicott, Illkirch, France

[73] Assignee: Alcatel Business Systems, Paris, France

[21] Appl. No.: 580,733

[22] Filed: Sep. 11, 1990

[30] Foreign Application Priority Data

Sep. 12, 1989 [FR] France .................. 89 11895

[51] Int. Cl.⁵ .................... H03D 3/24; H04J 3/06
[52] U.S. Cl. ......................... 375/119; 370/105.1
[58] Field of Search ................. 375/119, 120; 370/105.1; 331/11

[56] References Cited

U.S. PATENT DOCUMENTS 3,251,034  5/1966  Goode et al. ............... 375/114
3,575,554  4/1971  Schmidt .................... 375/116
4,598,413  7/1986  Széchenyi ................. 375/119

Primary Examiner—Curtis Kuntz
Assistant Examiner—T. Ghebretinsae
Attorney, Agent, or Firm—Sughrue, Mion, Zinn Macpeak & Seas

[57] ABSTRACT

A dual-mode synchronization device is designed in particular to recover the phase of the frame clock in a half-duplex transmission system. It is included in a receiver in a half-duplex digital transmission system in which a receiver receives frames only at regular intervals. The device comprises an energy sensing phase locking first system and a phase recovery second system which senses a reference pattern. A selector system selects one of the phase difference indications supplied by the first and second systems, under the control of a respective binary indication of loss or acquisition of synchronization. A particular application of the invention is to half-duplex transmission using the WAL2 code.

6 Claims, 3 Drawing Sheets

5,151,927

DUAL-MODE SYNCHRONIZATION DEVICE, IN PARTICULAR FOR FRAME CLOCK PHASE RECOVERY IN A HALF-DUPLEX TRANSMISSION SYSTEM

BACKGROUND OF THE INVENTION

1. Field of the Invention

The field of the invention is that of phase recovery devices for receivers in digital transmission systems.

2. Description of the Prior Art

The invention has been developed in the context of a half-duplex digital transmission system in which a receiver receives frames at regular intervals, which makes it necessary to recover the phase of a local clock at the frame frequency whose period is a high multiple of the local bit clock period.

There are various known synchronization methods applicable to signals of this type.

The known solutions usually effect synchronization by detecting the first bit of each frame received or by detecting a specific frame synchronization pattern. This pattern may consist in a violation of the code used to transmit the signal, for example.

Detecting the first received frame bit has the disadvantage of being highly sensitive to noise. On the other hand, the need to use a specific synchronization pattern involves a penalty in terms of throughput (data signalling rate) and additional complexity in the transmit-receive systems.

An object of the present invention is to alleviate the disadvantages of existing systems.

In more precise terms, a first object of the invention is to provide a synchronization system, in particular a frame synchronization system for a receiver which receives frames at regular intervals, which is easy to implement and which is highly immune to noise but offers high sensitivity for frame frequency acquisition.

Another object of the invention is to provide a synchronization device of this kind which, for some types of transmitted signal code at least, make it possible to avoid the use of a specific synchronization pattern in the transmitted signal.

An additional object of the invention is to provide a synchronization system which produces a pertinent phase difference indication which can be used, for example, to apply phase correction in a phase-locked loop external to the device in accordance with the invention.

SUMMARY OF THE INVENTION

The invention consists in a synchronization device, in particular for recovering phase synchronization of the local frame clock of a receiver, in the case of a digital signal formed by frames received at regular intervals, said signal being coded in a code having a detectable line pulse density, which device comprises:

phase locking first means delivering an indication of the phase difference between the local clock and the received signal when the presence on the line of said coded signal is detected, phase recovery second means supplying an indication of the phase difference between the local clock and the received signal when a received frame phase reference point is detected in a time window centered on the phase of the local clock, and means for selecting one of the phase difference indications supplied by said phase locking first means and said phase recovery second means under the control of a respective binary indication of loss or acquisition of synchronization.

The synchronization device in accordance with the invention is therefore a dual-mode device:

a first mode is used to achieve the synchronized state using a line energy sensor when the system is initialized and whenever synchronization is lost;

the second mode is used immediately the synchronized state is achieved; because it is based on simple temporal windowing of a received frame phase reference point, it is less sensitive to noise than the first mode.

The transmitted signal code is advantageously of the WAL2 code type, the received frame reference point consisting in the first zero-crossing of each frame. Of course, other signal transmission modes or codes may be used, associated with different frame reference points.

According to one advantageous characteristic of the invention, the means delivering said synchronization lock-on binary information comprise a flip-flop system whose first state selects the phase indication delivered by said phase locking first means and whose second state selects the phase indication delivered by said phase recovery second means, said flip-flop system being activated by:

first means for forcing said first state on confirmation of the absence of a received frame phase reference point in said window during N consecutive frames, second means for forcing said second state on confirmation of the presence of a received frame phase reference point in said window during M consecutive frames.

In this way switching from one phase recovery mode to the other is effected sufficiently far in advance but not excessively so, particularly in the case of a signal with a high noise content.

Said first and second forcing means are preferably counters selectively activated and initialized according to said information delivered by said phase locking first means and said phase recovery second means.

Other characteristics and advantages of the invention will emerge from the following description of one preferred embodiment of the device in accordance with the invention given by way of illustrative and nonlimiting example only and with reference to the appended diagrammatic drawings.

DETAILED DESCRIPTION OF THE PREFERRED EMBODIMENT

The synchronization system described hereinafter was designed for a half-duplex two-wire transmission system. In this embodiment the transmission code is a specific code of the WAL2 code type.

Figure 1:
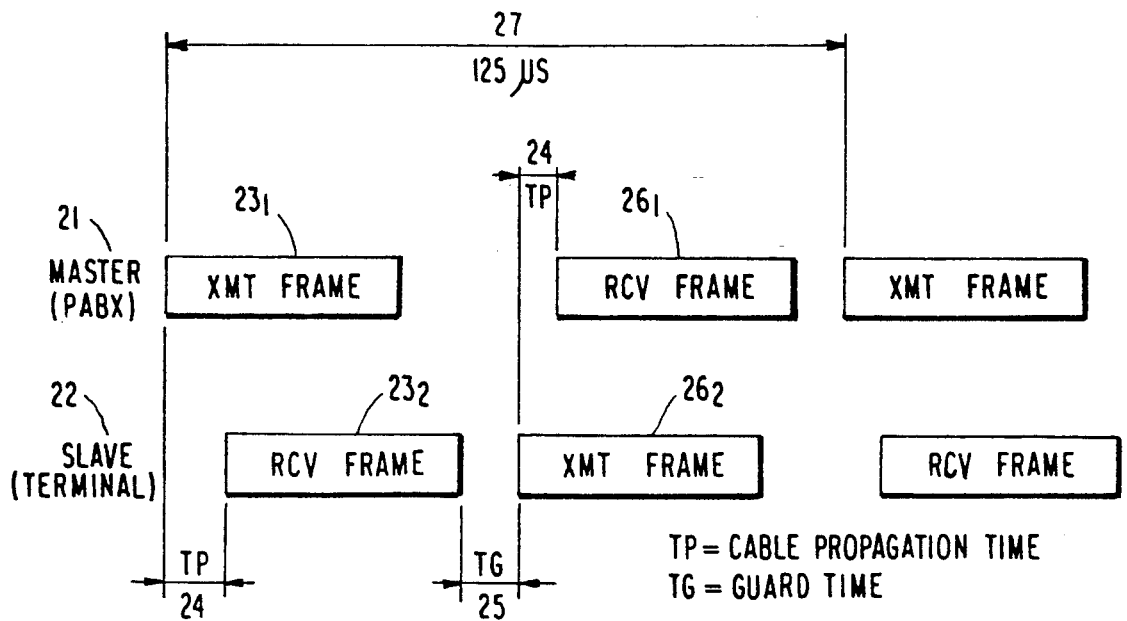
FIG. 1 shows the exchange of frames between a master terminal (a PABX, for example) and slave terminal in a half-duplex digital transmission system.

A half-duplex transmission system sends and receives data frames as shown in the FIG. 1 diagram. In FIG. 1, the line 21 represents the activity of the master terminal and the line 22 that of the slave terminal of a line of this kind. The master terminal is a PABX, for example.

A link of this kind operates in the following manner:

The master 21 sends a data frame $23_1$ to the slave terminal 22. After the cable propagation time TP 24 the frame $23_2$ is received by the slave 22.

The slave 22 waits to enable damping of the line signal (guard time TP 25) before sending a frame $26_2$ to the master 21.

The timing of the exchange of frames is controlled by the master 21 which, in this specific embodiment, sends a frame with a time period 27 of 125 μs.

In this system a bit clock and a frame clock must be recovered in order to decode the data received by the master 21 and by the slave 22 and to ensure correct timing of the frames transmitted by the slave.

According to the invention, synchronization is effected by establishing the phase difference between a uniquely defined reference point in the received frame and a reference clock at the frame frequency generated by the local clock system.

This function is implemented by a phase comparator, for example, which supplies a phase advance, lag or coincidence indication. This information can be used to correct the sensed phase difference in a system external to the device in accordance with the invention.

In the embodiment described hereinafter the line code used is the WAL2 code. This code has the following characteristics:

each symbol transmitted contains some energy;

the signal reception comparator optimum sensing threshold is 0 V;

each symbol includes a voltage zero-crossing.

These characteristics enable a synchronization device in accordance with the invention to be implemented without adding any synchronization pattern to the frame.

Note that the dual-phase code has the same characteristics and therefore likewise dispenses with the use of a specific synchronization mode.

Nevertheless, the device in accordance with the invention is compatible with other codes, such as the AMI code, subject to the addition of at least one synchronization signal to each frame.

The device in accordance with the invention is a duplex system which reduces susceptibility to noise and enables loss of synchronization to be detected by comparing information supplied by the two phase recovery modes. In both modes the received frame reference point, in the specific case of the WAL2 code, is the first zero-crossing of the frame. With the WAL2 code this reference point is always at the same location in the frame, irrespective of the data transmitted.

Figure 2:
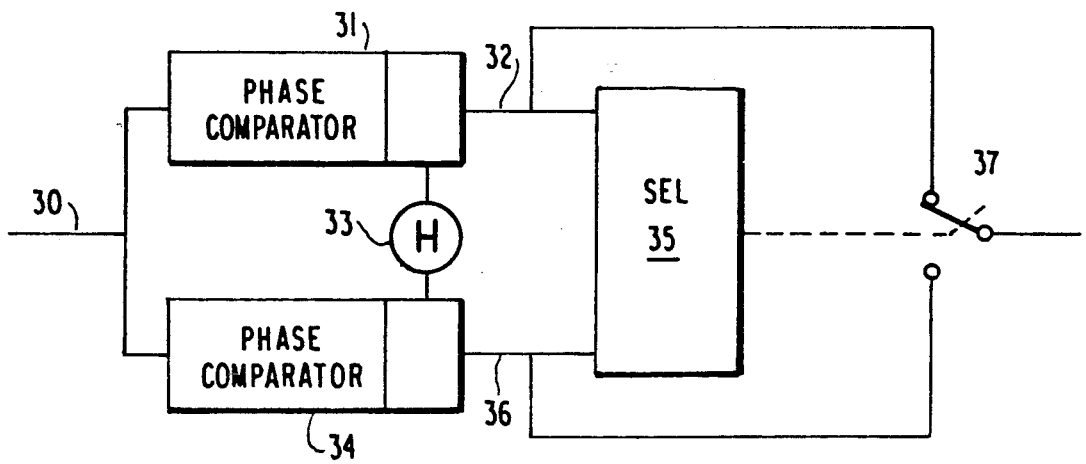
FIG. 2 is a block diagram illustrating the dual-mode synchronization principle of the device in accordance with the invention.

FIG. 2 shows the theory of this system.

A first phase comparator 31 senses the start of each frame in the received signal 30 by sensing the line signal level. With the WAL2 code each bit received contains some energy. Before the frame is received there is a period with no energy on the line. The "frame start" indication supplied by the energy sensor 31 is used to select the first zero-crossing of the received frame. The phase of this zero-crossing is then compared with the reference clock 33 supplied by the local clock system to provide a phase advance or lag indication 32.

As soon as synchronization is achieved, a second phase comparator 34 comes into play. This phase comparator 34 selects the zero-crossing in a time window around the local clock reference point to supply a phase comparison indication 36 independent of the zero-crossing selected by the energy sensor 31.

A selector 35 controls a switch 37 for selecting one or other synchronization mode according to the following logic:

if the zero-crossing selected by the energy sensor 31 is in the window M times in succession (in one specific embodiment M=4) then synchronization is regarded as achieved and the switch 37 selects the phase difference indication 36 supplied by the comparator 34;

if this zero-crossing is outside the window N times in succession (in one specific embodiment N=8) then synchronization is regarded as lost and the switch 37 selects the phase difference indication 32 supplied by the energy sensor 31.

The windowing phase recovery mode (34) is less sensitive to noise than the energy sensing mode (31) but it can only be used when synchronization has been achieved as it cannot distinguish the first zero-crossing from other zero-crossings in the received frame.

Figure 3:
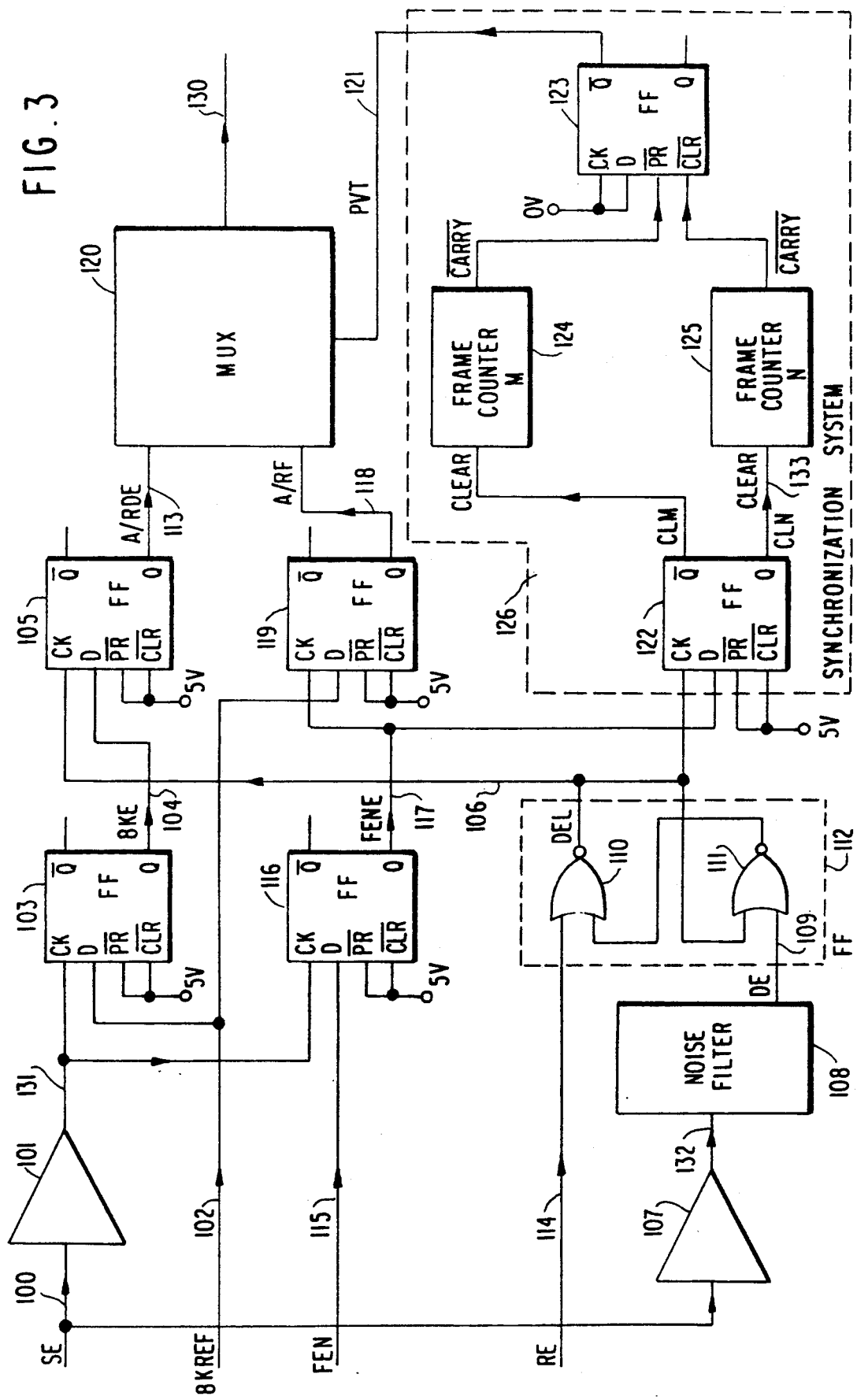
FIG. 3 is a block schematic of a preferred embodiment of dual-mode synchronization device in accordance with the invention.
Figure 4:
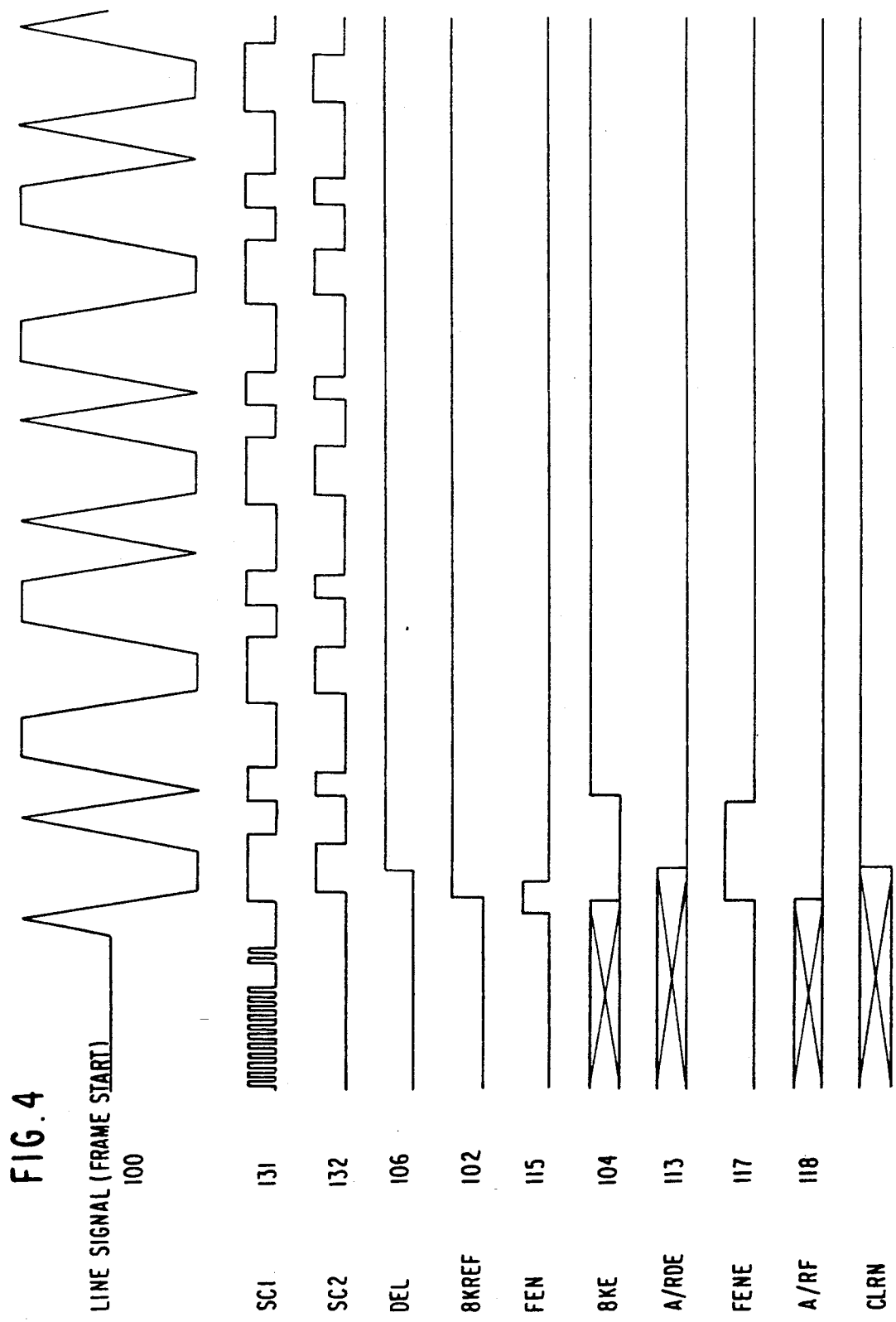
FIG. 4. is a synchronization diagram showing the main signals in the device from FIG. 3.

FIG. 3 shows in detail one embodiment of a device using the principle illustrated in FIG. 2. FIG. 4 shows the synchronization of the main signals in the circuit from FIG. 3 when the local frame clock is synchronized.

In FIG. 3, the comparator 101 senses zero-crossings of the received signal 100. In this specific embodiment, only falling edge (+ to −) zero-crossings are sensed, the first bit of the frame being always a binary zero. The output of the comparator 101 strobes the reference clock 8KREF 102 in the flip-flop 103. The frame clock 8KREF 102 is generated by the local clock system and is synchronized to the recovered bit and frame clocks.

If the zero-crossing is advanced (leads) relative to the rising edge of the local reference clock 8KREF 102, the signal 8KE 104 is set to logic 0. If it is lagging, the signal 8KE 104 is set to logic 1. The signal 8KE 104 therefore indicates the phase of each zero-crossing relative to the rising edge of 8KREF 102. The indication of the phase of the first zero-crossing of the frame is selected by the flip-flop 105. This flip-flop 105 is triggered by the rising edge of the signal DEL 106. The comparator 107 senses the energy of the received frame. In one specific embodiment the comparator 107 has a sensing threshold of −85 mV.

The output of the comparator 107 is filtered by a filter 108. A certain period is counted with no energy followed by a certain period with energy before the signal DE 109 goes to logic 1 at the output of the filter 108. The rising edge of the signal DE 109 triggers the R/S flip-flop 112 formed by the gates 110 and 111. The flip-flop 112 is disabled and reset to logic 0 during the transmission phase by the reset signal RE 114. The output of the gate 110 triggers the flip-flop 105 to validate the phase indication between the rising edge of 8KREF 102 and the first zero-crossing of the frame. The signal A/RDE 113 is therefore the phase indication generated by the energy sensing phase comparator.

The window FEN 115 encloses the rising edge of the local clock at the frame frequency 8KREF 102. Its width is such that only one zero-crossing can be in the window at a time. It is sufficiently wide, however, for the first zero-crossing of the frame in the synchronized state to be in the window in spite of the jitter superimposed on the received signal.

The zero-crossings sensed at the output of the comparator 101 strobe the signal FEN 115. In the synchronized state the signal FENE 117 from the flip-flop 116 goes to logic 1 with the first zero-crossing of the frame. The rising edge of the signal FENE 117 strobes the signal 8KREF 102 in the flip-flop 119. The output 118 of this flip-flop 119 indicates the phase difference between the rising edge of the signal 8KREF 102 and the first zero-crossing of the frame. The two phase indications A/RDE 113 and A/RF 118 constitute the inputs to the multiplexer 120. The multiplexer control signal PVT 121 selects one or other of these two signals according to the synchronization state. The output 130 of the multiplexer 120 supplies a phase advance, lag or coincidence indication.

The two flip-flops 122 and 123 form with the two counters 124 and 125 the synchronization system 126.

The output CLRN 133 of the flip-flop 122 goes to logic 1 if the zero-crossing in the window is the first zero-crossing of the received frame (zero-crossing selected by the energy sensor 107). In this case the counter 125 (value N) is reset to logic 0 and the counter 124 (value M) is activated. If the latter counter 124 counts M consecutive frames or if the first zero-crossing of the frame is in the window the flip-flop 123 is preselected and synchronization is regarded as achieved. If this zero-crossing is outside the window before a synchronization is achieved the counter 124 is reset to the value zero.

In the synchronized state, if the first zero-crossing of the frame is outside the window N times in succession the counter 125 (value N) resets the flip-flop 123 to logic 0.

The output 121 of the flip-flop 123 therefore selects, according to the synchronization state, either the phase indication 113 from the energy sensing phase comparator or the phase indication 118 from the windowing phase comparator.

FIG. 4 shows the synchronization of the main signals from the FIG. 3 circuit in the synchronized state of the device:
the line signal 100,
the sensed signals 131, 132 at the output of the respective comparators 101, 107,
the signal DEL 106 which triggers the flip-flop 105,
the reference clock 8KREF 102 at the frame frequency,
the time window signal FEN 115,
the signal 8KE 104 indicating the phase of each zero-crossing of the received signal 100 relative to the clock signal 8KREF 102,
the signal A/RDE 113 representing the phase information generated by the energy sensing phase comparator 101,
the signal SENE 117 from the flip-flop 116,
the signal A/RF 118 representing the phase difference between the rising edge of the signal 8KREF 102 and the first zero-crossing of the frame,
the output signal CLRN 130 of the flip-flop 122 of the synchronization system 126.

There is claimed:

1. A synchronization device, in particular for recovering phase synchronization of a local frame clock of a receiver, in the case of a digital signal formed by frames received at regular intervals, said signal being coded in a code having a detectable line pulse density, which device comprises:
coded signal detection means for detecting the presence of said coded signal at said receiver;
phase locking means delivering an indication of a phase difference between the local clock and the received signal when the presence of said coded signal is detected,
phase reference point detection means for detecting a received frame phase reference point in a time window centered on the phase of the local clock;
phase recovery means supplying an indication of the phase difference between the local clock and the received signal when said received frame phase reference point is detected in said time window centered on the phase of the local clock, and
selecting means for selecting one of the phase difference indications supplied by said phase locking means and said phase recovery means.

2. A device according to claim 1 wherein said received signal is in a WAL2 type code, said received frame reference point of each frame comprising the first zero-crossing of the received signal.

3. A device according to claim 1 wherein the selecting means includes:
a flip-flop system for delivering a binary indication of acquisition of synchronization, said flip-flop system having a first state and a second state,
first means for forcing said first state on confirmation of absence of a received frame phase reference point in said window during N consecutive frames, where N is an integer,
second means for forcing said second state on confirmation of the presence of a received frame phase reference point in said window during M consecutive frames, where M is an integer, and
a selector responsive to said first and second states of said flip-flop system for selecting the phase difference indications supplied by said phase locking means and said phase recovery means, respectively.

4. Device according to claim 3 wherein said first and second means comprise counters selectively activated and initialized according to said indications provided by said phase locking means and phase recovery means, said first counter counting the number of consecutive frames which do not contain a received frame phase reference point in said window, and said second counter counting the number of consecutive frames which do contain a received frame phase reference point in said window.

5. A device according to claim 1, wherein said selecting means selects the phase difference indication supplied by said phase locking means until phase synchronization is acquired and thereafter selects the phase difference indication supplied by said phase recovery means until phase synchronization is lost.

6. A device according to claim 5, wherein said selecting means selects said phase difference indication supplied by said phase locking means upon confirmation of absence of a received frame phase reference point in said window during N consecutive frames, and selects the phase difference indication supplied by said phase recovery means upon confirmation of the presence of a received frame phase reference point in said window during M consecutive frames.

* * * * *